US010271406B2

(12) United States Patent
Lesaffre et al.

(10) Patent No.: US 10,271,406 B2
(45) Date of Patent: Apr. 23, 2019

(54) DISTRIBUTED ELECTRIC LIGHTING ARCHITECTURE FOR MOTOR VEHICLE

(71) Applicant: Valeo Vision, Bobigny (FR)

(72) Inventors: Olivier Sebastien Lesaffre, Pantin (FR); Gilles Briand, Mougins (FR); Christophe Cros, Nanterre (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 15/263,684

(22) Filed: Sep. 13, 2016

(65) Prior Publication Data
US 2017/0079120 A1 Mar. 16, 2017

(30) Foreign Application Priority Data

Sep. 14, 2015 (FR) ..................... 15 58529

(51) Int. Cl.
*H05B 37/02* (2006.01)
*B60Q 11/00* (2006.01)
*H05B 33/08* (2006.01)
*H04L 29/08* (2006.01)

(52) U.S. Cl.
CPC ......... *H05B 37/0254* (2013.01); *B60Q 11/00* (2013.01); *H05B 33/0815* (2013.01); *H05B 33/0845* (2013.01); *H05B 33/0884* (2013.01); *H04L 67/12* (2013.01)

(58) Field of Classification Search
CPC ............ H05B 33/0845; H05B 33/0884; H05B 33/0815; H05B 37/0254; H05B 37/0272; H05B 37/0263; H04L 67/12; B60Q 11/00

USPC ......... 315/77, 291, 295, 297, 307–308, 312; 362/459
See application file for complete search history.

(56) References Cited

U.S. PATENT DOCUMENTS

| | | | |
|---|---|---|---|
| 9,103,521 B2 | 8/2015 | Nishitani et al. | |
| 9,411,659 B2 | 8/2016 | Sah | |
| 2005/0174473 A1* | 8/2005 | Morgan | H05B 33/0803 348/370 |
| 2005/0231133 A1* | 10/2005 | Lys | H02M 1/4225 315/291 |
| 2010/0052536 A1* | 3/2010 | Zielinski | H05B 33/0857 315/77 |
| 2011/0018441 A1* | 1/2011 | Tanaka | B60Q 1/0094 315/82 |
| 2012/0161633 A1 | 6/2012 | Nishitani et al. | |
| 2013/0193878 A1 | 8/2013 | Zimmermann | |

FOREIGN PATENT DOCUMENTS

DE 102010031242 A1 9/2011

* cited by examiner

*Primary Examiner* — Tung X Le
*Assistant Examiner* — Henry Luong
(74) *Attorney, Agent, or Firm* — Oblon, McClelland, Maier & Neustadt, L.L.P.

(57) ABSTRACT

An electric power supply system using a single converter of the Boost type for supplying a plurality of lighting modules of a motor vehicle with electric voltage. Each module comprises a dedicated converter of the Buck type in order to ensure the regulation of the electric current in such a way as to meet the needs of the light sources of the lighting module in question. A communication network which connects the centralized unit and the lighting modules makes it possible to ensure the control of the modules and the detection of faults, as well as to notify the latter to other devices of the motor vehicle.

23 Claims, 1 Drawing Sheet

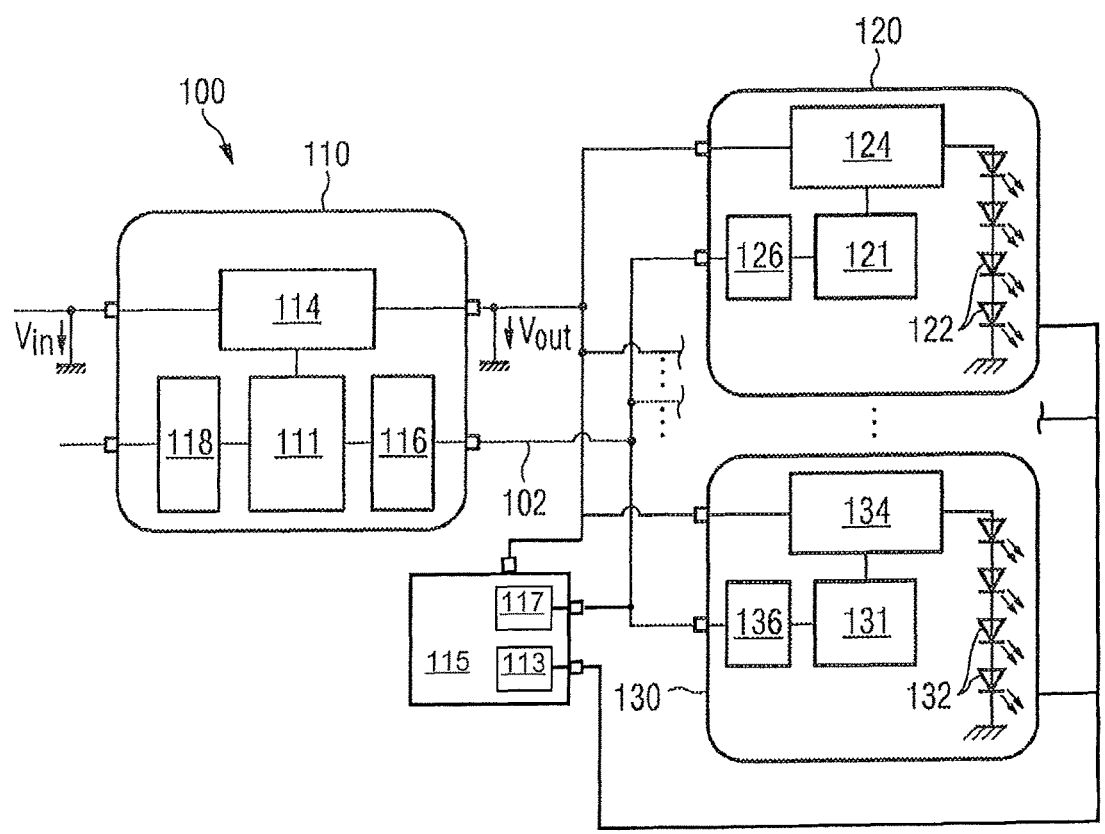

DISTRIBUTED ELECTRIC LIGHTING ARCHITECTURE FOR MOTOR VEHICLE

CROSS-REFERENCE TO RELATED APPLICATIONS

This application claims priority to the French application 1558529, filed Sep. 14, 2015, which application is incorporated herein by reference and made a part hereof.

BACKGROUND OF THE INVENTION

1. Field of the Invention

The invention relates to the lighting and light signaling field, notably for motor vehicles.

2. Description of the Related Art

In the field of lighting and light signaling for motor vehicles, it is becoming increasingly common to use light sources based on light-emitting semiconductor components, for example light emitting diodes, LED. An LED component emits light rays when a voltage having a value at least equal to a threshold value called the forward voltage is applied across its terminals.

In a known way, one or more LEDs of a lighting module for a motor vehicle are powered using power supply control means, which comprise converter circuits. In general, each lighting module comprises dedicated electric power supply control means. The electric power supply control means comprise, on the one hand, a DC/DC converter capable of raising the electric voltage supplied by a source within the motor vehicle, for example a battery, to a higher electric voltage. On the other hand, the electric power supply control means comprise current regulation means which are capable of supplying a direct current suitable for powering the LEDs of the lighting module. Such an architecture of converters is generally known as "Boost-Buck" or as "step up step down".

With the growing number of lighting functions and lighting modules per lighting device of a motor vehicle, the provision of a plurality of Boost-Buck devices, each of which occupies a relatively large space on a printed circuit, gives rise to significant volume restrictions and a large number of electrical connections.

SUMMARY OF THE INVENTION

The purpose of the invention is to propose a solution addressing the abovementioned problem. More particularly, the purpose of the invention is to propose a distributed architecture for the electric power supply of a plurality of lighting modules for a motor vehicle.

The invention relates to an electric power supply system for a plurality of lighting modules of a motor vehicle. Each lighting module comprises at least one light source and means of regulating the electric current powering the light source or sources. The system comprises moreover a central module comprising an electric voltage converter unit configured for converting an input electric voltage into an output electric voltage and for supplying the output electric voltage in such a way that it is common to all of the lighting modules. The electric power supply system is noteworthy in that each lighting module comprises data transmission/reception means intended for sending/receiving data and in that the central module comprises first data transmission/reception means intended for sending/receiving data to/from at least one device of the motor vehicle, as well as second data transmission/reception means intended for sending/receiving data to/from each of the lighting modules using a data transmission channel.

The electric current regulation means and/or the data transmission/reception means of each module can preferably be mounted on a support for that module. The converter component and the first and second data transmission/reception means of the central module can preferably be mounted on a support of that module, all of the supports being separate from each other.

Preferably, the electric current regulation means can comprise a voltage step-down unit, for example of the Buck type.

The electric voltage converter unit of the central module can preferably be configured for selectively converting an input electric voltage into an output electric voltage higher than the input electric voltage as a function of data received by the first data transmission/reception means. If so desired, the converter unit can comprise a voltage step-up converter, notably of the Boost type.

Preferably, the central module can transmit data commanding the switching on of only a portion of the lighting modules, or even only a portion of the light sources of these lighting modules, as a function of data received selecting the lighting modules and/or the light sources. If necessary, the converter unit can preferably be configured for converting the input voltage into an output electric voltage that is sufficient for all of the selected modules and/or all of the selected light sources to be able to emit light.

The device of the vehicle can for example be a camera, a speed sensor, a steering wheel or a central control device of the motor vehicle.

The data transmission channel can preferably be a data transmission channel common to all of the lighting modules. Alternatively, the data transmission channel can comprise a global channel comprising a network of channels each one of them connecting a lighting module to the central module. The system can moreover comprise one or more power supply harnesses connecting the central module to one or more or even to all of the lighting modules in order to supply the output electric voltage to those lighting modules.

Preferably, the electric voltage converter unit of the central module can be capable of converting an input electric voltage of 12 V into an output electric voltage having a value of between 30 V and 60 V.

Preferably, the central module can be physically distant from the lighting modules. Preferably the lighting modules can be physically distant from each other.

Preferably, the current regulator of at least one of the lighting modules comprises a converter of the Buck type, also called a step down or a linear converter.

Preferably, each lighting module can comprise processing means connected to the data transmission/reception means and to the electric current regulation means, intended for managing the regulation of the electric current as a function of the data received by the module.

Preferably, the processing means, the data transmission/reception means and the electric current regulation means of a lighting module can be produced on a single printed circuit.

Each lighting module can preferably comprise processing means connected to the data transmission/reception means and to the electric current regulation means, intended to detect the operational state of the electric current regulation means, and/or of the light sources, and to transmit data relative to that operation to the central module.

At least one of the lighting modules can preferably comprise a plurality of light sources and individual control means of the light sources arranged such that this lighting module carries out a lighting and/or a dynamic signaling function, for example of the road illumination or scrolling direction indicator type. If necessary, the processing means can also be capable of detecting the operational state of the individual control means of the light sources. Preferably, the transmitted data can comprise the temperature of a module, measured by temperature measuring means, or information relative to a fault of a light source.

Preferably, the central module can comprise processing means connected to the first and to the second data transmission/reception means, intended to relay data received from a device of the motor vehicle to at least one of the lighting modules.

The processing means can preferably decode control data received from a device of the motor vehicle and relay them to the specific lighting module for which the control is intended. The data can, by way of example, comprise a command intended for switching a specific lighting function on or off. The command can be intended to produce a specific orientation of an optical element of a lighting module.

The destination lighting module or modules can preferably be determined by the nature of the data received or by a specific address included in the received data.

Preferably, the central module can comprise processing means connected to the first and to the second data transmission/reception means, intended to relay data received from at least one of the lighting modules to a device of the motor vehicle.

Once data is received by the central module from a lighting module, the processing unit decodes it and, according to the type of data received, the processing unit acts on the converter unit or relays the data to another device of the motor vehicle, using the first data transmission means of the central module.

The received data can preferably come from a central control module, BCM (Body Control Module), of the motor vehicle. The received data can comprise instructions to switch on a specific lighting function which can be carried out using one of the lighting modules.

The received and relayed data can preferably be data relative to the operation of the lighting module or modules.

The operational data can comprise information relative to the voltage of the light sources, for example measured by voltage measuring means disposed in the lighting modules, or information relative to a fault of a light source, for example obtained by diagnostic means disposed in the lighting modules.

When a failure of one of the lighting modules is signaled by the received data, the processing means of the central module can preferably be configured to stop the operation of the converter in order to cut off the power supply of all of the lighting modules.

Preferably, each lighting module can be intended for carrying out at least one specific lighting function of the motor vehicle. It can for example be a lighting function of the low beam, high beam, selective high beam or other type.

The first data transmission/reception means of the central module can preferably be adapted for transmitting/receiving data on a data bus of the LIN (Local Interconnected Network) or CAN (Controller Area Network) type.

Preferably, the second data transmission/reception means of the central module and the data transmission/reception means of each of the lighting modules can be adapted for transmitting/receiving data on a data bus of the LIN (Local Interconnected Network) or CAN (Controller Area Network) type.

Preferably, the electric power supply system according to the invention can comprise a control module for one or more lighting modules, the central module being arranged to supply the output electric voltage to the control module, the control module comprising:
  an actuator for driving a movement of the lighting module or modules,
  data transmission/reception means intended for sending/receiving data, the second data transmission/reception means of the central module being intended for sending/receiving data to/from the control module via the data transmission channel.

The actuator can preferably be arranged to carry out a function of correction of the range of the light beam or beams emitted by the lighting module or modules or a function of dynamic turn following.

The measures of the invention are advantageous in that they allow the use of a converter of the Boost type centralized and common to a plurality of lighting modules of a motor vehicle. This gives rise to a saving of volume occupied and of weight in comparison with known solutions. The use of data communication means makes it possible to receive commands intended for specific lighting modules from other devices of the motor vehicle at the level of the centralized entity. The latter relays the commands to the specific destination lighting modules. Similarly, information relating to the operation of the lighting modules, generated at the level of each one of the lighting modules, is received in a centralized manner by the common element of the architecture, which can relay it to other devices of the motor vehicle, for example to the BCM, for example by using a data bus of the CAN or LIN type integrated in the motor vehicle.

These and other objects and advantages of the invention will be apparent from the following description, the accompanying drawings and the appended claims.

BRIEF DESCRIPTION OF THE ACCOMPANYING DRAWINGS

Other features and advantages of the present invention will be better understood with the help of the description and of the following drawing:

FIG. 1 is a block diagram of the distributed architecture according to the invention, in a preferred embodiment.

DETAILED DESCRIPTION OF THE PREFERRED EMBODIMENTS

Unless specifically indicated otherwise, technical features described in detail for a given embodiment can be combined with the technical features described in the context of other embodiments described by way of non-limiting example.

The invention relates to an electric power supply system for a plurality of lighting modules of a motor vehicle. Each lighting module preferably carries out at least one lighting function of the motor vehicle, such as for example the high beam function, the daytime running light function or the directional indicator light function. Each lighting module comprises at least one light source, which is preferably a semiconductor component light source, for example a light emitting diode, LED. A lighting module can comprise a plurality of LEDs connected in series. A module also comprises electric current regulation means, for example of the Buck type. The current regulation means form a converter unit which ensures that the light sources of the module are supplied with an electric current of magnitude suitable for their operation. A lighting module can comprise moreover optical elements such as light guides or reflectors capable of directing the light rays emitted by the light source or sources in predetermined directions. These measures are not described in detail in the context of the present invention. Each of the lighting modules is powered upstream by a common central module, which comprises a converter unit, for example of the Boost type. This converter is configured for converting an input electric voltage, provided by a battery of the motor vehicle, into an output electric voltage, which is supplied in common to all of the lighting modules.

The electric voltage supplied by the central converter unit is distributed to the lighting modules by means of electrical connections.

Apart from these electrical connections between the central converter unit and the lighting modules, the architecture according to the invention comprises communication links separate from the electrical power supply links. On the one hand, the central unit is configured to be able to receive and to send data from/to other devices of the motor vehicle using adapted communication means. On the other hand, the central unit is configured to be able to receive and to send data from/to each of the lighting modules using adapted communication means. The communication means comprise data reception/transmission means and use for example a data bus of the LIN (Local Interconnected Network) or CAN (Controller Area Network) type acting as a data transmission channel. Alternatively, a network architecture using dedicated transmission channels connecting each of the lighting modules to the central module can be envisaged.

FIG. 1 shows a preferred embodiment of the architecture according to the invention in the form of a block diagram.

The system 100 comprises a central module 110 which incorporates an electric voltage converter unit 114 configured for converting the input electric voltage $V_{IN}$ into an electric voltage $V_{OUT}$ of different value. Preferably, the voltage $V_{IN}$ is of the order of 12 V, whilst $V_{OUT}$ is between 30 V and 60 V, for example. The voltage $V_{OUT}$ can moreover be adapted to the needs of the lighting modules and as a function of the commands received by the central module 110.

The central module 110 comprises first data transmission/reception means 118 intended for sending/receiving data to/from at least one device of the motor vehicle. By way of example it can be a camera, the steering wheel or a central control device of the motor vehicle. Second data transmission/reception means 116 are provided for sending/receiving data to/from each of the lighting modules of the system 100. Processing means 111, using for example a microprocessor element or a programmable microcontroller are adapted in such a way as to interpret the messages or data received by the central module 110.

The electric power supply system according to the invention can also comprise a control module 115 for one or more of the lighting modules 120, 130. The central module 110 is arranged to supply the output electric voltage to control module 115. Control module 115 includes an actuator 113 for driving a movement of the lighting module or modules 120, 130 and data transmission/reception means 117 configured to send/receive data. Second data transmission/reception means 116 sends/receives data to/from control module 115 via the data transmission channel.

When a command intended for a specific module among the lighting modules of the system 100 is received from a device of the motor vehicle by means of the first data transmission/reception means 118, the processing means 111 decode the data received and relay them to the specific destination lighting module of the command. In such a scenario, the data can by way of example comprise a command for the purpose of switching on or switching off a specific lighting function. In another embodiment, involving the use of a lighting module having an optical element that can be oriented by orientation means, the command can be for producing a specific orientation of the optical element of the module, in order to guide the light rays emitted by the module in a predetermined direction. The data received by the central module 110 are not therefore necessarily limited to the electric power supply of the lighting modules, but it can also relate to other functionalities of the lighting modules. An actuator element 113 (FIG. 1) can notably be provided for driving a movement of the lighting module or modules following a received command which is for the purpose of correcting the range of the light beam or beams emitted by a lighting module, or which is for the purpose of providing a dynamic turn following function.

The processing means 111 are also able to act on the operation of the electric voltage converter unit 114, following data received by the first data transmission/reception means 118 or the second data transmission/reception means 116. For example, when a fault of one of the lighting modules is signaled by the received data, the processing means 111 are able to stop the operation of the electric voltage converter unit 114 in order to cut off the power supply of all the lighting modules. Other scenarios can be envisaged according to targeted applications and without however departing from the scope of the present invention.

An electrical distribution network composed of conductive wires and adapted connectors connects the output of the Boost electric voltage converter unit 114 of the central module 110 to each of the lighting modules 120, 130 and more specifically to a current regulation element of the Buck type 124, 134 of the latter. By way of illustration, FIG. 1 shows two lighting modules 120, 130. The invention is not however limited to this example and the system can in other embodiments comprise a larger plurality of lighting modules 120, 130. Similarly, each of the lighting modules 120, 130 is shown comprising four light sources 122, 132 of the LED type. The invention however covers lighting modules 120, 130 each using different numbers and/or types of light sources 122, 132.

The lighting modules 120, 130 comprise moreover data transmission/reception means 126, 136 intended for sending and/or receiving data. The data transmission/reception means 126, 136 are connected by a data transmission channel 102, for example by a data bus of the CAN or LIN type, to the second data transmission/reception means of the central module 110. This makes it possible to establish communication between the central module 110 and the lighting modules 120, 130 and vice-versa.

Processing means 121, 131 using for example a microprocessor unit or a programmable microcontroller are adapted in such a way as to interpret the messages or data received by the lighting module 120, 130. The processing means 121, 131 are preferably also adapted to send data relative to the operation of the lighting module 120, 130 to the central module 110. This information can comprise information relative to the failure of a component of the lighting module 120, 130 such as the current regulation element of the Buck type 124, 134 or one of the light sources 122, 132, or information relative to the normal operation of the lighting module 120, 130, for example measurements of temperatures giving an indication of the junction temperature of the LEDs or light sources 122, 132 of the lighting module 120, 130. Once these data are received by the central module 110, the processing means 111 decodes them and, depending on the type of data received, the processing unit 111 acts on the electric voltage converter unit 114 or relays the data to another device of the motor vehicle, using the first data transmission/reception means 118 of the central module 110.

The provision of the central module 110 makes it possible to connect different pluralities of lighting modules 120, 130 to it according to the type of motor vehicle. Only the interpretation of data received/relayed by the central module 110 has to be adapted from one architecture to another, which only involves programming steps. Each lighting module 120, 130 connected to the central module 110 can have its own current magnitude requirements and can for example be configured for generating and/or reacting to data or messages specific to the lighting function that it is carrying out. The proposed distributed architecture is therefore distinguished by a high level of modularity, whilst limiting the space and weight requirements of the involved electronic items in comparison with the solutions known in the prior art.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. An electric power supply system for a plurality of lighting modules of a motor vehicle, each of said plurality of lighting modules comprising:
    at least one light source; and
    electric current regulation means of regulating an electric current powering said at least one light source;
    said electric power supply system comprising a central module comprising an electric voltage converter unit configured for converting an input electric voltage into an output voltage higher than said input voltage and for supplying said output electric voltage in such a way that it is common to all of said plurality of lighting modules;
    wherein each of said plurality of lighting modules comprises data transmission and reception means intended for sending and receiving data; and
    said central module comprises first data transmission and reception means intended for sending and receiving data to and from at least one device of said motor vehicle, as well as second data transmission and reception means intended for sending and receiving data to and from each of said plurality of lighting modules using a data transmission channel,
    wherein said electric voltage converter unit includes a step-up unit to convert said input electric voltage to said output electric voltage based upon the data received from the first data transmission and reception means.

2. The electric power supply system according to claim 1, wherein each of said plurality of lighting modules comprises processing means connected to said data transmission and reception means and to said electric current regulation means, intended for managing the regulation of said electric current as a function of the data received by said plurality of lighting modules.

3. The electric power supply system according to claim 1, wherein each of said plurality of lighting modules comprises processing means connected to said data transmission and reception means and to said electric current regulation means, intended to detect an operational state of said electric current regulation means, and/or of said at least one light source, and to transmit data relative to the operational state to said central module.

4. The electric power supply system according to claim 1, wherein said central module comprises processing means connected to said first data transmission and reception means and to said second data transmission and reception means, intended to relay the data received from the at least one device of said motor vehicle to at least one of said plurality of lighting modules.

5. The electric power supply system according to claim 4, wherein a destination lighting module or modules are determined by a nature of the data received or by a specific address included in the data received.

6. The electric power supply system according to claim 1, wherein said central module comprises processing means connected to said first data transmission and reception means and to said second data transmission and reception means, intended to relay the data received from at least one of said plurality of lighting modules to the at least one device of said motor vehicle.

7. The electric power supply system according to claim 1, wherein the data received from and transmitted to the plurality of lighting modules are data relative to an operation of said plurality of lighting modules.

8. The electric power supply system according to claim 1, wherein each of said plurality of lighting modules is intended for carrying out at least one specific lighting function of said motor vehicle.

9. The electric power supply system according to claim 1, wherein said first data transmission and reception means of said central module are adapted for transmitting and receiving the data on a data bus of a LIN (Local Interconnected Network) or CAN (Controller Area Network) type.

10. The electric power supply system according to claim 1, wherein said second data transmission and reception means of said central module and said data transmission and reception means of each of said plurality of lighting modules are adapted for transmitting and receiving data on a data bus of a LIN (Local Interconnected Network) or CAN (Controller Area Network) type.

11. The electric power supply system according to claim 1, wherein said electric power supply system comprises a control module for one or more of said plurality of lighting modules, said central module being arranged to supply said output electric voltage to said control module, said control module comprising:
    an actuator for driving a movement of said plurality of lighting modules; and
    a data transmission and reception means intended for sending and receiving data to and from the central module;
    said second data transmission and reception means of said central module being intended for sending and receiving the data to and from said control module via said data transmission channel.

12. The electric power supply system according to claim 2, wherein the processing means is configured to send information to said central module via said second transmission and reception means for controlling said electric voltage converter unit.

13. An electric power supply system for a plurality of lighting modules of a motor vehicle, each of said plurality of lighting modules comprising:
- at least one light source; and
- an electric current regulator for regulating an electric current powering said at least one light source;
- said electric power supply system comprising a central module comprising an electric voltage converter unit configured for converting an input electric voltage into an output electric voltage higher than said input voltage and for supplying said output electric voltage in such a way that it is common to all of said plurality of lighting modules;
- wherein each of said plurality of lighting modules comprises a data transmitter and receiver intended for sending and receiving data; and
- said central module comprises a first data transmitter and receiver intended for sending and receiving data to and from at least one device of said motor vehicle, as well as a second data transmitter and receiver intended for sending and receiving data to and from each of said plurality of lighting modules using a data transmission channel,
- wherein said electric voltage converter unit includes a step-up unit to convert said input electric voltage to said output electric voltage based upon the data received from the first data transmitter and receiver.

14. The electric power supply system according to claim 13, wherein each of said plurality of lighting modules comprises a processor connected to said data transmitter and receiver and to said electric current regulator, intended for managing the regulation of said electric current as a function of the data received by said plurality of lighting modules.

15. The electric power supply system according to claim 13, wherein each of said plurality of lighting modules comprises a processor connected to said data transmitter and receiver and to said electric current regulator, intended to detect an operational state of said electric current regulator, and/or of said at least one light source, and to transmit data relative to the operational state to said central module.

16. The electric power supply system according to claim 13, wherein said central module comprises a processor connected to said first data transmitter and receiver and to said second transmitter and receiver, intended to relay the data received from the at least one device of said motor vehicle to at least one of said plurality of lighting modules.

17. The electric power supply system according to claim 16, wherein a destination lighting module or modules are determined by a nature of the data received by the destination lighting module or determined by a specific address included in the received data.

18. The electric power supply system according to claim 13, wherein said central module comprises a processor connected to said first data transmitter and receiver and to said second data transmitter and receiver, intended to relay the data received from at least one of said plurality of lighting modules to the at least one device of said motor vehicle.

19. The electric power supply system according to claim 13, wherein the data received and transmitted by the plurality of lighting modules are data relative to an operation of said plurality of lighting modules.

20. The electric power supply system according to claim 13, wherein each of said plurality of lighting modules is intended for carrying out at least one specific lighting function of said motor vehicle.

21. The electric power supply system according to claim 13, wherein said first data transmitter and receiver of said central module are adapted for transmitting and receiving the data on a data bus of a LIN (Local Interconnected Network) or CAN (Controller Area Network) type.

22. The electric power supply system according to claim 13, wherein said second data transmitter and receiver of said central module and said data transmitter and receiver of each of said plurality of lighting modules are adapted for transmitting and receiving the data on a data bus of a LIN (Local Interconnected Network) or CAN (Controller Area Network) type.

23. The electric power supply system according to claim 13, wherein said electric power supply system comprises a control module for one or more of said plurality of lighting modules, said central module being arranged to supply said output electric voltage to said control module, said control module comprising:
- an actuator for driving a movement of said plurality of lighting modules; and
- a data transmitter and receiver intended for sending and receiving data to and from the central module;
- said second data transmitter and receiver of said central module being intended for sending and receiving the data to and from said control module via said data transmission channel.

* * * * *